US011017463B2

(12) United States Patent
Chu et al.

(10) Patent No.: US 11,017,463 B2
(45) Date of Patent: May 25, 2021

(54) METHOD AND SYSTEM FOR EMOTIONAL INTELLIGENCE VIA VIRTUAL REALITY AND BIOMETRICS

(71) Applicant: Mastercard International Incorporated, Purchase, NY (US)

(72) Inventors: Christine Chu, New York, NY (US); Tyler C. Welsh, New York, NY (US); Jo-Anne Loh, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 255 days.

(21) Appl. No.: 15/791,537

(22) Filed: Oct. 24, 2017

(65) Prior Publication Data

US 2019/0122295 A1    Apr. 25, 2019

(51) Int. Cl.
| | |
|---|---|
| *G06Q 40/00* | (2012.01) |
| *G06Q 40/02* | (2012.01) |
| *G06F 16/9535* | (2019.01) |
| *G06F 16/2457* | (2019.01) |
| *G06K 9/00* | (2006.01) |

(52) U.S. Cl.
CPC ....... *G06Q 40/02* (2013.01); *G06F 16/24575* (2019.01); *G06F 16/9535* (2019.01); *G06K 9/00288* (2013.01)

(58) Field of Classification Search
CPC .. G06Q 40/00; G06Q 40/02; G06F 16/24575; G06F 16/9535; G06K 9/00288
See application file for complete search history.

(56) References Cited

U.S. PATENT DOCUMENTS

| 10,210,569 B1* | 2/2019 | Kim ..................... G06Q 20/108 |
| 2009/0146775 A1 | 6/2009 | Bonnaud et al. |
| 2010/0010317 A1 | 1/2010 | De Lemos |
| 2016/0228060 A1 | 8/2016 | Mazar et al. |

(Continued)

OTHER PUBLICATIONS

Data mining the unconscious Weiss, Catharine. Salve Regina University, ProQuest Dissertations Publishing, 2017 (Year: 2017).*

*Primary Examiner* — Lalita M Hamilton
(74) *Attorney, Agent, or Firm* — Buchanan Ingersoll & Rooney PC

(57) ABSTRACT

A method for providing recommendations based on emotional intelligence includes: storing an account profile including a structured data set related to a transaction account including an account identifier, a budget restriction, and baseline biometric characteristics; receiving transaction data related to a proposed transaction including transactional information non-compliant with the budget restriction; receiving current biometric characteristics of an individual associated with the proposed transaction; determining impulsiveness of the proposed transaction based on a comparison of the baseline biometric characteristics to the current biometric characteristics; and transmitting a transaction recommendation based on the determined impulsiveness, wherein the recommendation is to proceed with the proposed transaction if the proposed transaction is determined to not be impulsive, and the recommendation is to not proceed with the proposed transaction if the proposed transaction is determined to be impulsive.

28 Claims, 6 Drawing Sheets

(56) References Cited

U.S. PATENT DOCUMENTS

| | | |
|---|---|---|
| 2017/0014041 A1 | 1/2017 | Stut et al. |
| 2017/0017767 A1 | 1/2017 | Flower et al. |
| 2017/0027523 A1 | 2/2017 | Venkatraman et al. |
| 2017/0071480 A1 | 3/2017 | Daniels |
| 2017/0100060 A1 | 4/2017 | Banet et al. |
| 2019/0147529 A1* | 5/2019 | Wright .................. G06Q 40/00 |

* cited by examiner

METHOD AND SYSTEM FOR EMOTIONAL INTELLIGENCE VIA VIRTUAL REALITY AND BIOMETRICS

FIELD

The present disclosure relates to providing recommendations based on emotional intelligence utilizing biometrics in combination with virtual or augmented reality, specifically the measuring of biometrics to determine impulsiveness of a proposed action and the providing of a recommendation course of action related thereto.

BACKGROUND

For many people, budgeting can play a very important role in their life. In many cases, budgeting helps to ensure that a person keeps to within certain limits when it comes to certain categories of spending or overall spending. In many cases, there may be no physical limits on their ability to spend beyond a budgeted amount, such as due to technology constraints of their issuing financial institution. In some instances, certain budgetary restrictions may be available on their transaction account, but may not be specific enough to suit the person's budget, such as an inability to have separated budgeting categories based on merchant industry. In these cases, a consumer may have to rely on their own willpower in order to keep within a set budget.

However, some consumers may lack such willpower and have a tendency to make impulse purchases that can result in overspending. Currently, there is a lack of tools and systems to even identify when a purchase may be an impulse purchase, let alone alert the consumer of their impulsiveness to assist the consumer in stopping a transaction before it starts. As a result, without having strict controls on the usage of their transaction account, an impulsive consumer may be unable to stick to budgeted limits, which may be detrimental to their financial well-being. Thus, there is a need for a technological solution to be able to identify potential impulsive purchases and provide recommendations to a consumer based thereon to assist the consumer in keeping to a pre-established budget.

SUMMARY

The present disclosure provides a description of systems and methods for the providing of recommendations based on emotional intelligence. When a payment transaction is proposed, the consumer's biometrics are identified and compared to baseline biometrics for that consumer to determine a level of impulsiveness for the proposed transaction. The level of impulsiveness is used in combination with a pre-determined budget to identify a recommendation if the transaction should proceed or be stopped that is provided to the consumer to help guide their decision. In some cases, the consumer can established merchant-specific criteria, such as for instances where the consumer may be more or less likely to make impulse purchases that are detrimental to their overall budget.

A method for providing recommendations based on emotional intelligence includes: storing, in an account database of a processing server, an account profile, wherein the account profile includes a structured data set related to a transaction account including at least an account identifier, a budget amount, and one or more baseline biometric characteristics; receiving, by a receiving device of the processing server, transaction data related to a proposed transaction, wherein the transaction data includes at least a transaction amount exceeding the budget amount; receiving, by the receiving device of the processing server, one or more current biometric characteristics of an individual associated with the proposed transaction; determining, by a determination module of the processing server, impulsiveness of the proposed transaction based on a comparison of the one or more baseline biometric characteristics to the one or more current biometric characteristics; and electronically transmitting, by a transmitting device of the processing server, a transaction recommendation based on the determined impulsiveness, wherein the recommendation is to proceed with the proposed transaction if the proposed transaction is determined to not be impulsive, and the recommendation is to not proceed with the proposed transaction if the proposed transaction is determined to be impulsive.

A system for providing recommendations based on emotional intelligence includes: an account database of a processing server configured to store an account profile, wherein the account profile includes a structured data set related to a transaction account including at least an account identifier, a budget amount, and one or more baseline biometric characteristics; a receiving device of the processing server configured to receive transaction data related to a proposed transaction, wherein the transaction data includes at least a transaction amount exceeding the budget amount, and receive one or more current biometric characteristics of an individual associated with the proposed transaction; a determination module of the processing server configured to determine impulsiveness of the proposed transaction based on a comparison of the one or more baseline biometric characteristics to the one or more current biometric characteristics; and a transmitting device of the processing server configured to electronically transmit a transaction recommendation based on the determined impulsiveness, wherein the recommendation is to proceed with the proposed transaction if the proposed transaction is determined to not be impulsive, and the recommendation is to not proceed with the proposed transaction if the proposed transaction is determined to be impulsive.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
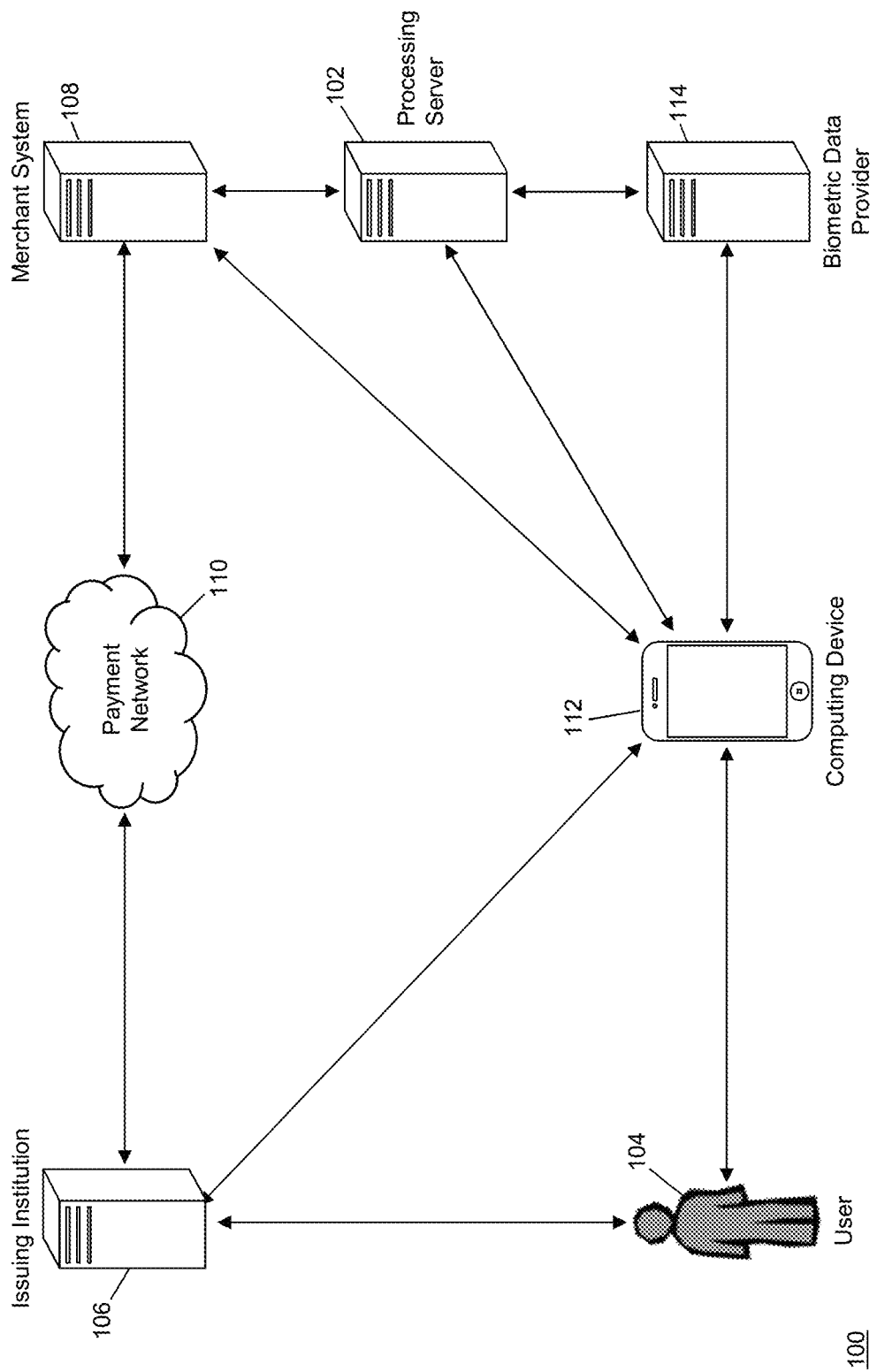
FIG. 1 is a block diagram illustrating a high level system architecture for providing recommendations based on emotional intelligence in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for the Providing Recommendations Based on Emotional Intelligence

FIG. 1 illustrates a system 100 for the providing of recommendations for a proposed consumer payment transaction based on emotional intelligence using consumer biometrics and budgeted limitations on spending.

The system 100 may include a processing server 102. The processing server 102, discussed in more detail below, may be configured to provide recommendations to a user 104 for a proposed payment transaction related to the user's impulsiveness. In the system 100, the user 104 may have a transaction account issued thereto for use in funding payment transactions by an issuing institution 106. The issuing institution 106 may be a financial institution, such as an issuing bank, or other entity configured to issue transaction accounts suitable for use in funding payment transactions. In some embodiments, the issuing institution 106 may not have adequate tools suitable for preventing the approval of payment transactions based on budgetary restrictions.

The user 104 may register with the processing server 102 to receive recommendations for proposed payment transactions based on emotional intelligence. The user 104 may register with the processing server 102 via a computing device 112, which may be used to provide an interface to the user 104 for interacting with the processing server 102, such as via a web page, application program, application programming interface, etc. The computing device 112 may be any type of computing device suitable for being configured to perform the functions discussed herein, such as a laptop computer, desktop computer, notebook computer, tablet computer, cellular phone, smart phone, smart watch, smart television, wearable computing device, implantable computing device, etc.

As part of the registration process, the user 104 may provide the processing server 102 with one or more baseline biometric characteristics. Biometric characteristics may be biometric data points captured for the user 104 using one or more suitable biometric measuring devices. Any suitable type of biometric that may change over time may be used, such as heart rate, pupil dilation, respiratory rate, blood oxygenation level, etc. The baseline biometric characters may be captured via one or more biometric measuring devices such as an emotion detection sensor (for example, physiological sensors, e.g., galvanic skin response sensors, facial recognition sensors, heart rate sensors, sweat detection sensors, stress sensors, or any other sensors tend to indicate physiological responses), biometric sensors (for example, one or more iris-scanning sensors, thermal imaging sensors, or any other sensors that can acquire biometric information from the users). These types of sensors and their use in disclosed in a number of documents including, e.g., electronic heart rate monitors such as disclosed in U.S. Patent Applications 2017/0071480, 2017/0027523 and 2017/0014041; pupil dilation and emotional response tracking such as disclosed in U.S. Patent Application 2010/0010317 and 2009/0146775; respiratory rate monitors and other vital signs such as disclosed in U.S. Patent Application 2017/0100060, 2017/0017767 and 2016/0228060 to identify a few examples, all of which are herein incorporated by reference), which may include or be comprised of the computing device 112, or one or more other devices in communication therewith. The baseline biometric characteristics, for instance when measured when the user 104 is asked to sample their base-line condition such as during a time they are not subject to stimuli (e.g., in a quiet room without outside distractions), may then be electronically transmitted to the processing server 102 using a suitable communication network and method. In some instances, the biometric characteristics may be captured by a third party, such as a biometric data provider 114, which may forward the baseline biometric characteristics to the processing server 102 directly, or via the computing device 112. Biometric measuring devices may include heart rate monitors, respiratory monitors, specialized eyewear, etc. Baseline biometric characteristics may be captured by the user 104 during a time when no impulsive actions are being performed. In some cases, the user 104 may provide biometric characteristics at several different times in order for the processing server 102 to identify a baseline for each biometric characteristic based on the plurality of received characteristics.

The processing server 102 may receive the baseline biometric characteristics and store them in an account profile directly associated with the user 104. In such cases, the account profile may have a unique identification value associated therewith that may be used to identify the user 104 and data associated therewith in communications exchanged between the user 104 and processing server 102 and any other entities or devices (e.g., the biometric data provider 114, issuing institution 106, computing device 112, etc.). In some cases, the unique identification value may be a primary account number or other unique value associated with the transaction account issued to the user 104 by the issuing institution 106. In other cases, the processing server 102 may identify a unique identification value, also referred to herein as an account identifier, that may be provided to the user 104 (e.g., via the computing device 112) during the registration process.

Once the user 104 has registered their baseline biometric characteristics, the user 104 may also establish one or more budgetary restrictions. A budgetary restriction may be comprised of at least a budgeted amount or transactional restriction, where any transaction that may exceed the budgeted amount or is otherwise non-compliant with the applicable restriction may be subject to a recommendation by the processing server 102 based on a determined level of impulsiveness for the transaction. In some cases, a single budgetary restriction may be set for a transaction account. In other cases, the user 104 may set multiple budgetary restrictions, where each one may be associated with specific criteria, such as merchant industry, geographic location, time and/or date, etc. For example, the user 104 may wish to set a budgetary restriction on a category of spending that they know they are very impulsive with (e.g., clothing, electronics, restaurants, etc.), or may set a budgetary restriction for transactions conducted at a time of day when they tend to make a large number of impulsive purchases (e.g., between 10:00 pm and 2:00 am). The budgetary restrictions may be provided to the processing server 102 (e.g., via the computing device 112), which may store the budgetary restrictions in the account profile associated with the user 104. Additional information regarding the setting of consumer budgeting can be found in U.S. patent application Ser. No. 14/481,898, entitled "Method and System for Consumer Budgeting based on Historical Purchase Data," filed on Sep. 9, 2014, which is herein incorporated by reference in its entirety.

After the user 104 has been registered and their budget(s) set, the user 104 may approach (e.g., physically or via a virtual platform) a merchant with the intention of conducting a payment transaction. Prior to initiating the payment transaction, the user 104 may, using their computing device 112, request a recommendation from the processing server 102 for the transaction. The request for a recommendation may include at least a transaction amount for the proposed payment transaction, and may also include any additional criteria based on the budgetary restriction(s) set by the user 104, such as information identifying the merchant, geographic location, time and/or date, etc. In some cases, the product(s) proposed for purchase may be directly identified in the request, such as using a unique identification value associated therewith, such as a universal product code, European article number, etc.

In some embodiments, the request may be manually submitted by the user 104 prior to initiating the payment transaction at a merchant system 108. In other embodiments, the processing server 102 may be notified by another entity or automatically prior to the initiation of the payment transaction. For instance, in one example, the computing device 112 may have an electronic wallet application program stored therein used to convey payment credentials in a payment transaction. When the user 104 executes the electronic wallet application program and instructs the program to convey payment credentials, the electronic wallet application program may automatically submit a request for recommendation to the processing server 102, which may include data received by the computing device 112 from the merchant system 108 for the potential transaction or as input by the user 104. In another example, the user 104 may possess (e.g., in the computing device 112 or another device) augmented reality device or a virtual reality device, where products that may be viewed using the augmented reality or virtual reality device may be identified (e.g., via image recognition or other suitable technique) and identification data associated therewith provided to the processing server 102 automatically or following instruction by the user 104, which may be prompted by the augmented reality or virtual reality device. For example, the augmented reality device may detect the user 104 examining a product, may identify the product, and may prompt the user 104, such as by asking "Would you like to see a recommendation for purchasing this product?"

The processing server 102 may receive the request for recommendation, which may include the transaction amount and any other data associated with the proposed payment transaction, as well as the account identifier associated with the user 104. The processing server 102 may first determine if the purchase would cause the user 104 to exceed any applicable budgetary restriction(s). In some cases, if no restriction would be exceeded by the purchase, the processing server 102 may immediately return a recommendation that the user 104 is safe to proceed with the payment transaction. In other cases, the processing server 102 may be configured to always (e.g., based on settings of the user 104) determine recommendations based on impulsiveness. In such cases, compliance with budgetary restriction(s) may be one criteria used in the recommendation in addition to impulsiveness.

The processing server 102 may receive current biometric characteristics of the user 104 prior to the proposed payment transaction. In one embodiment, the biometric characteristics may be captured prior to submission of the request and included therein. In another embodiment, the biometric data provider 114 may capture the biometric characteristics of the user 104 as the computing device 112 prepares and/or submits the request, and may provide the biometric characteristics to the processing server 102 (e.g., with the account identifier). In yet another embodiment, once the processing server 102 receives the request, the processing server 102 may request that the computing device 112 capture current biometric characteristics for the user 104, which may be captured and then provided to the processing server 102.

The processing server 102 may compare the current biometric characteristics of the user 104 with the baseline biometric characteristics included in their account profile to determine a level of impulsiveness based thereon. Determining whether a transaction is an impulse buy can involve measuring one biometric characteristic (e.g., iris dilation) or a combination of two or more (e.g., iris dilation and increased heart rate), and can be relatively simple or relatively complex depending on the number of different sensors and degree of certainty to be achieved. It can be by research on a panel of people for statistical analysis, or could be for the individual, via a series of tests using various sensors and different stimuli while having the subjects report their feelings or by monitoring their reactions (e.g., test subjects being monitored while shopping and reporting whether the purchased items were objectively or subjectively believed to be wise choices, etc.). The above-cited documents provide further details of the interpretation of biometrics as a determination of a variety of emotional responses. Impulsiveness may be measured and reported using any suitable metric, such as a numerical scale (e.g., 0 to 100). The processing server 102 may then identify a recommendation to proceed with the payment transaction or not to proceed with the payment transaction based on at least the level of impulsiveness. In some instances, a threshold for determining whether or not a proposed payment transaction should proceed may set by the user 104 as part of the registration process. In some such instances, each budgetary restriction may have its own threshold associated therewith. In some cases, the threshold may be different if the budgeted amount for applicable budgetary restrictions is exceeded or not exceeded by the proposed payment transaction. For instance, more impulsiveness may be acceptable if a budgeted amount is not being exceeded.

The processing server 102 may then electronically transmit the recommendation in response to the request, which may be transmitted to the computing device 112 using any suitable communication network and method. The computing device 112 may display the recommendation to the user 104, who may then decide to proceed or not proceed with the payment transaction based thereon. In some instances, if the processing server 102 recommends that the transaction not proceed, the processing server 102 may identify one or more alternative transactions. For instance, the processing server 102 may identify an alternative purchase of a lower transaction amount, where the impulsiveness may be at an acceptable level. For example, the user 104 may be eyeing (e.g., as detected via augmented reality) a designer dress in a very impulsive purchase that would greatly exceed their set budget restriction. The processing server 102 may recommend not proceeding with the payment transaction, and may suggest an alternative dress that is more reasonably priced. The computing device 112 may present the alternative to the user 104, which may assist the user in walking away from their impulsive purchase.

When the user 104 decides to proceed with a payment transaction, the user 104 may carry out the payment transaction with the merchant system 108 using traditional systems and methods. As part of the processing of the payment transaction, the merchant system 108 may submit (e.g., directly or via one or more intermediate entities, such as an acquiring institution and/or gateway processor) transaction data for the payment transaction to a payment network 110. The payment network 110 may process the payment transaction using traditional methods and systems, which may include seeking approval by the issuing institution 106 that issued the transaction account being used by the user 104 to fund the payment transaction.

Once the payment transaction is successfully processed, the processing server 102 may be configured to update any associated budgetary restrictions, such as by reducing the available budgeted amount for any applicable restrictions. In one embodiment, the processing server 102 may be informed of a completed payment transaction by the merchant system 108. In another embodiment, the computing device 112 may inform the processing server 102 of a completed transaction. In yet another embodiment, the issuing institution 106 may provide the processing server 102 with data regarding a completed transaction. In still another embodiment, the processing server 102 may receive the data from the payment network 110. In some instances, the processing server 102 may be a part of an issuing institution 106 or payment network 110, and may receive the transaction data as part of the internal processes of such an entity.

The methods and systems discussed herein thus enable a user 104 to have guidance on proceeding or not proceeding with a payment transaction based on budgetary restrictions and their own impulsiveness measured using emotional intelligence. The processing server 102 may provide such guidance to the user 104 even in instances where their issuing institution 106 may be unable to place controls on account usage, providing the user 104 with assistance in following a budget. In addition, the use of emotional intelligence may provide for improved guidance to enable a user 104 to transact freely if a transaction is not being performed on impulse (e.g., the user 104 may be exceeding a budget due to auto repairs that are necessary and not impulsive), but help the user 104 resist their impulsiveness for unnecessary or extravagant transactions. Such guidance may thus provide for more useful assistance to users 104 even in instances where their transaction account may have controls available for use, which would prevent some transactions that may be necessary for the user to exceed a control, such as a medical emergency.

Processing Server

Figure 2:
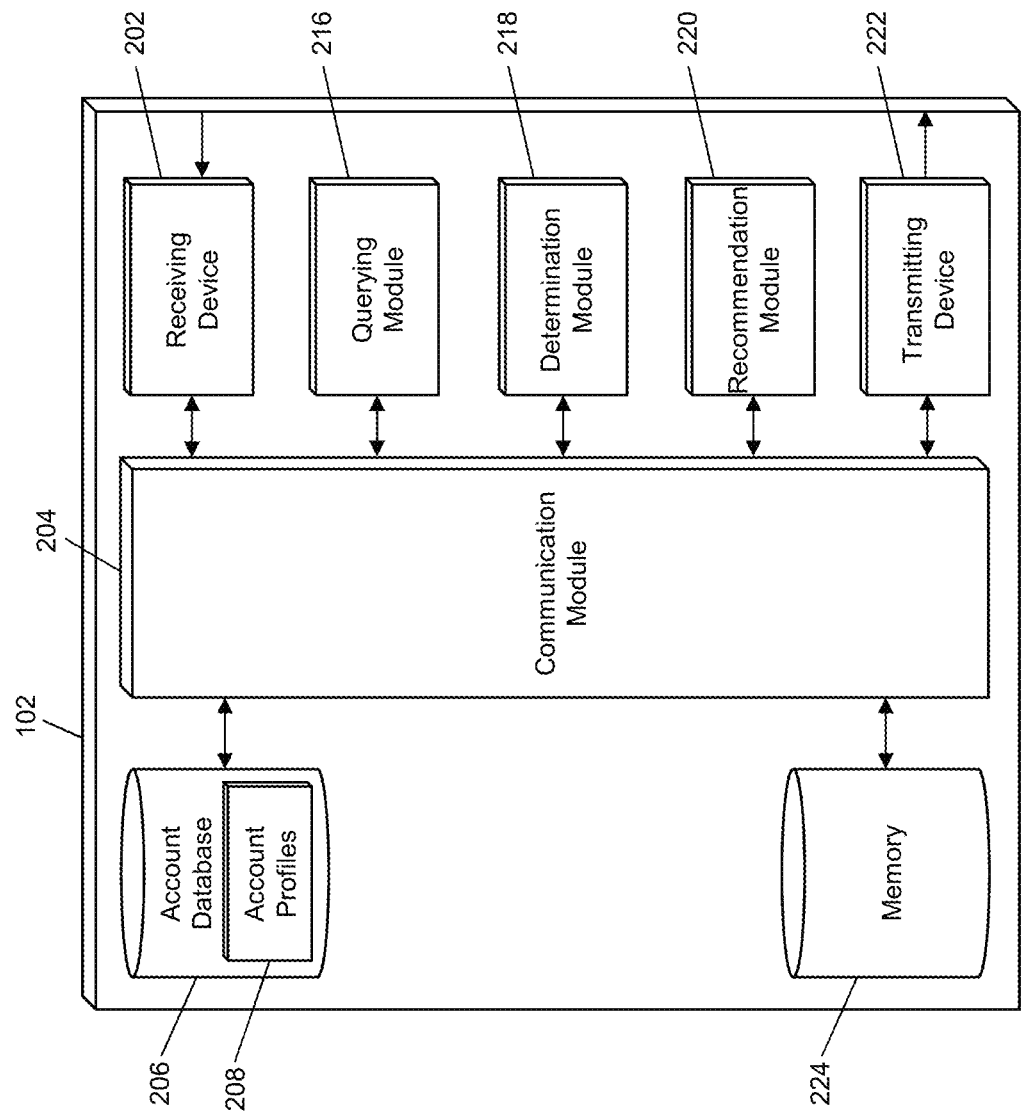
FIG. 2 is a block diagram illustrating the processing server of the system of FIG. 1 for providing recommendations based on emotional intelligence in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, merchant systems 108, payment networks 110, computing devices 112, biometric data providers 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 112 that are superimposed or otherwise encoded with data registering or modifying budgetary restrictions, requests for recommendations that include proposed transaction data, and/or transaction data for completed payment transactions. The receiving device 202 may also be configured to receive data signals that are superimposed or otherwise encoded with biometric data, which may be electronically transmitted by computing devices 112 or biometric data providers 114. The receiving device 202 may also be configured to receive data signals superimposed or otherwise encoded with transaction data for completed payment transactions, which may be electronically transmitted by any suitable entity, such as the issuing institution 106, merchant system 108, or payment network 110.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, determination module 218, recommendation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include an account database 206. The account database 206 may be configured to store a account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a registered user account. An account profile 208 may include at least an account identifier used for identification of the account profile 208 and communications associated therewith, one or more baseline biometric characteristics, and one or more budgetary restrictions, where each budgetary restriction may include at least a budgeted amount, and may also include one or more criteria for determining applicability of a proposed payment transaction, such as merchant industry, geographic location, time and/or date, product category, etc.

The processing server 102 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 102 as necessary. The querying module 216 may, for example, execute a query on the account database 206 to identify an account profile 208 that corresponds to a request for a recommendation based on an account identifier included therein.

The processing server 102 may also include a determination module 218. The determination module 218 may be configured to make determinations based on supplied and identified data as part of the functions of the processing server 102 as discussed herein. The determination module 218 may receive a request for a determination to be made as input, which may include or refer to data for use therein, may make the requested determination, and may output the determination to another module or engine of the processing server 102. The determination module 218 may, for example, be configured to determine applicable budgetary restrictions for a proposed transaction based on transaction data, determine if a proposed transaction exceeds any applicable budgetary restrictions based on budgetary amounts and transaction amounts, and determine a level of impulsiveness for a transaction based on a comparison of current biometric characteristics to baseline biometric characteristics.

The processing server 102 may also include a recommendation module 220. The recommendation module 220 may be configured to make recommendations for distribution to a user 104 to provide guidance to the user 104 in following budgetary restrictions set thereby. The recommendation module 220 may receive data as input, may make a recommendation based on the supplied data, and may output the recommendation to another module or engine of the processing server 102. For example, the recommendation module 220 may be configured to recommend if a proposed transaction should proceed or not proceed based on at least the level of impulsiveness for the transaction (e.g., determined by the determination module 218), and may also base the recommendation on additional criteria, such as compliance with a budgetary restriction, thresholds set by the user 104, etc. In some instances, the recommendation module 220 may be configured to recommend an alternative purchase if the recommendation module 220 recommends that a proposed payment transaction not proceed. In such instances, the alternative purchase may one such that a recommendation for such a purchase would be to proceed with the payment transaction.

The processing server 102 may also include a transmitting device 222. The transmitting device 222 may be configured to transmit data over one or more networks via one or more network protocols. In some instances, the transmitting device 222 may be configured to transmit data to computing devices 112, biometric data providers 114, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to computing devices 112 that are superimposed or otherwise encoded with recommendations for a proposed payment transaction, which may recommend that the payment transaction proceed or not proceed, and, in some cases, may also include a recommendation for an alternative transaction. The transmitting device 222 may also be configured to electronically transmit data signals superimposed or otherwise encoded with a request for biometric characteristics, which may be electronically transmitted to a computing device 112 or biometric data provider 114, and may include an account identifier associated with the user 104 for whom the current biometric characteristics are being requested.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Providing Recommendations Using Emotional Intelligence

Figure 3A:
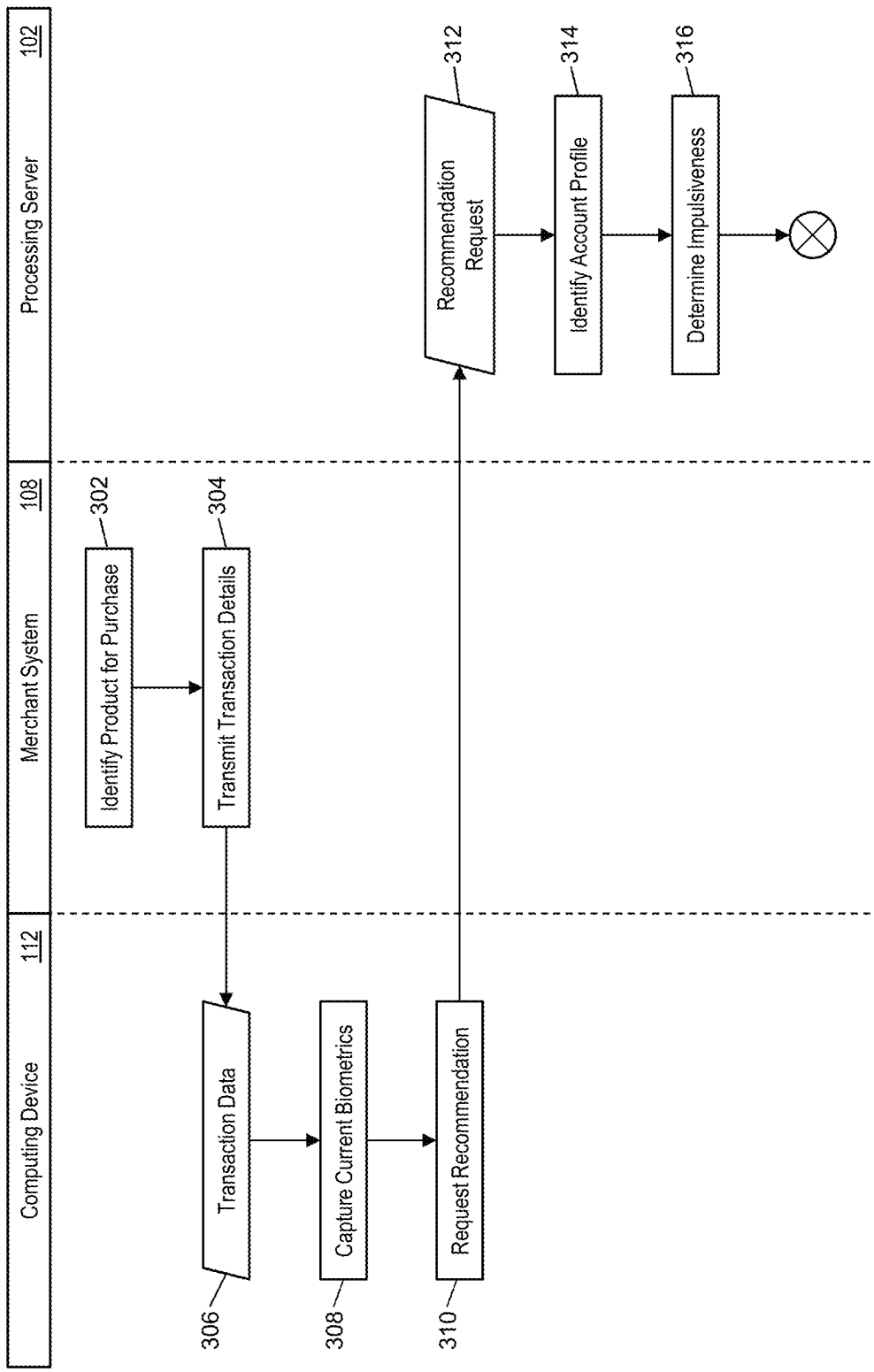
FIGS. 3A and 3B are a flow diagram illustrating a process for providing a recommendation for a transaction based on emotional intelligence in the system of FIG. 1 in accordance with exemplary embodiments.
Figure 3B:
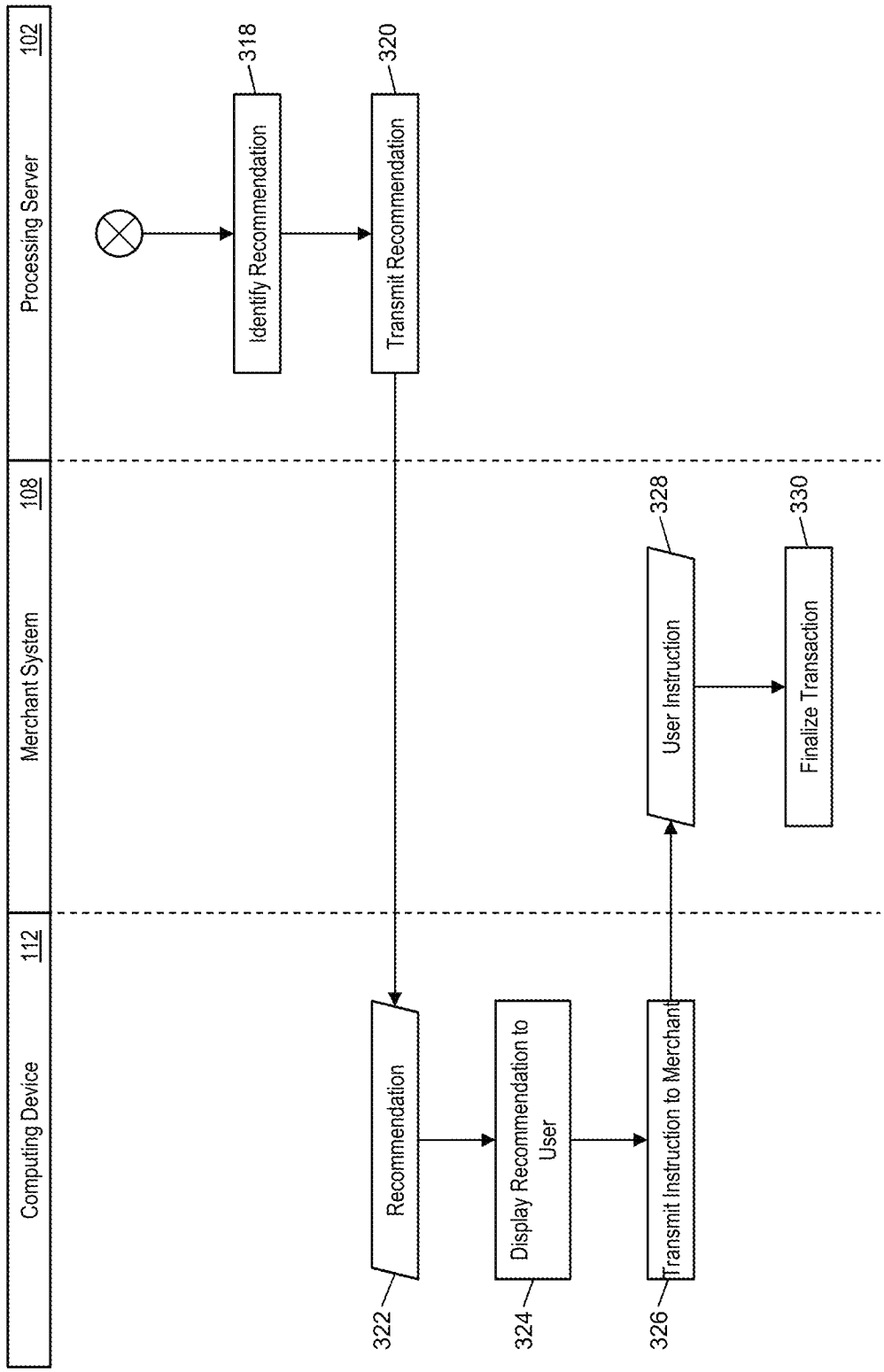

FIGS. 3A and 3B illustrates a process in the system 100 of FIG. 1 for providing a recommendation to the user 104 for a proposed payment transaction based on emotional intelligence. It will be apparent to persons having skill in the relevant art that the request for a recommendation initiated by the computing device 112 in the process illustrated in FIGS. 3A and 3B is one example, and that the request may be initiated using alternative processes and/or devices, as discussed above.

In step 302, the merchant system 108 may identify a product selected by the user 104 for purchase, such as by receiving the selection via a web page or application program, having the user 104 present a physical item at a point of sale device of the merchant system 108, etc. In step 304, the merchant system 108 may identify transaction details for the payment transaction (e.g., transaction amount, geographic location, time and date, currency type, etc.) and may electronically transmit the transaction details to the computing device 112 using a suitable communication network and method, such as near field communication or the Internet.

In step 308, the computing device 112 may receive the transaction data, which may be forward to an electronic wallet application program executed by the computing device 112 or another application program that may be configured to interact with the processing server 102, such as a web browsing application program or an application program configured to connect to an application programming interface of the processing server 102. In step 308, the computing device 102 may capture one or more current biometric characteristics of the user 104. In some cases, the computing device 102 may capture the biometric characteristics directly. In other cases, the computing device 102 may utilize one or more interfaced biometric measuring devices or request current biometric characteristics from an external biometric data provider 114.

In step 310, the computing device 112 may electronically transmit a request for a recommendation for the proposed payment transaction to the processing server 102. The request may include at least an account identifier associated with the user 104, the transaction data received from the merchant system 108, and the current biometric characteristics. In step 312, the receiving device 202 of the processing server 102 may receive the request for a recommendation. In step 314, the querying module 216 of the processing server 102 may execute a query on the account database 206 of the processing server 102 to identify an account profile 208 stored therein that includes the account identifier included in the received recommendation request.

In step 316, the determination module 218 of the processing server 102 may determine a level of impulsiveness for the proposed payment transaction. The level of impulsiveness may be based on at least a comparison of the current biometric characteristics to the baseline biometric characteristics for the user 104 stored in the identified account profile 208. In some instances, the level of impulsiveness may also be based on at least one or more budgetary restrictions applicable to the proposed payment transaction, the transaction data for the proposed payment transaction, and/or any additional criteria, such as user settings set by the user 104 during registration with the processing server 102 and/or creation/modification of the applicable budgetary restriction(s). In step 318, the recommendation module 220 of the processing server 102 may identify a recommendation for the proposed payment transaction to proceed or not proceed with the payment transaction based on at least the determined level of impulsiveness, and may also be based on thresholds set by the user 104 and the applicable budgetary restrictions. In some embodiments, the recommendation module 220 may identify one or more alternative transactions. In some such embodiments, alternative transaction may only be identified if the recommendation for the proposed payment transaction is to not proceed.

In step 320, the transmitting device 222 of the processing server 102 may electronically transmit the identified recommendation to the computing device 112 using a suitable communication network and method. In step 322, the computing device 112 may receive the recommendation from the processing server 102. In step 324, the computing device 112 may display the recommendation to the user 104 using a display device interfaced therewith. In step 326, the computing device 112 may receive an instruction from the user 104 as to whether or not to proceed with the payment transaction, and may electronically transmit an associated instruction to the merchant system 108 using a suitable communication network and method. In step 328, the merchant system 108 may receive the instruction, and, in step 330, may finalize the payment transaction accordingly, such as by canceling the transaction or submitting the transaction to a payment network 110 for processing. In cases where the payment transaction is successfully processed, the receiving device 202 of the processing server 102 may receive transaction data for the proposed payment transaction, or a notification that the transaction was successfully processed (e.g., the transaction data having been previously received in the recommendation request), and the querying module 216 may execute a query on the account database 206 to update the applicable budgetary restriction(s) for the user's account profile 208 accordingly.

Exemplary Method for Providing Recommendations Based on Emotional Intelligence

Figure 4:
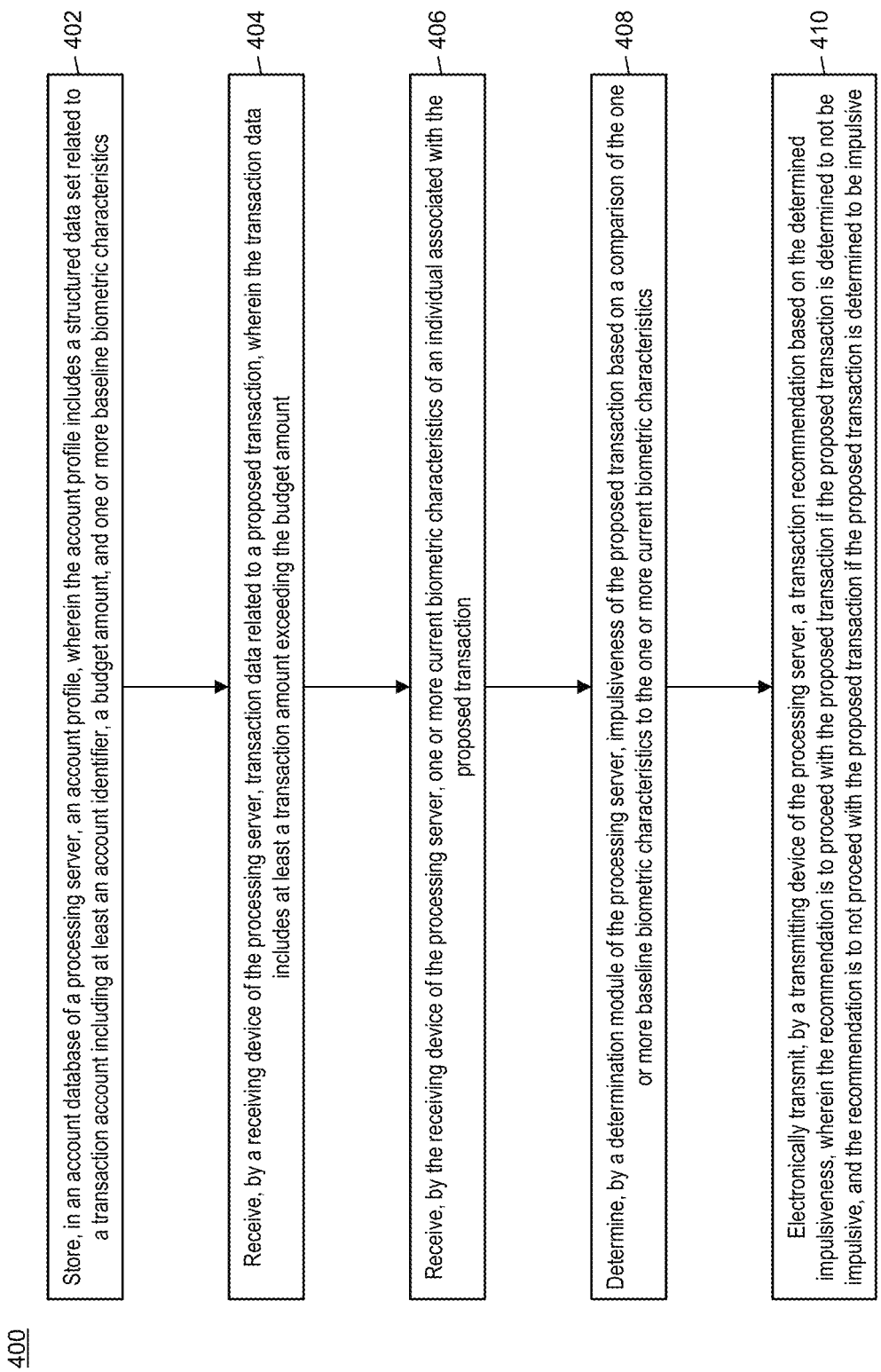
FIG. 4 is a flow chart illustrating an exemplary method for providing recommendations based on emotional intelligence in accordance with exemplary embodiments.

FIG. 4 illustrates a method 400 for the providing of a recommendation to a user device for a proposed payment transaction based on emotional intelligence determined using biometric characteristics.

In step 402, an account profile (e.g., account profile 208) may be stored in an account database (e.g., the account database 206) of a processing server (e.g., the processing server 102), wherein the account profile includes a structured data set related to a transaction account including at least an account identifier, a budget amount, and one or more baseline biometric characteristics. In step 404, transaction data related to a proposed transaction may be received by a receiving device (e.g., the receiving device 202) of the processing server, wherein the transaction data includes at least a transaction amount exceeding the budget amount. In step 406, one or more current biometric characteristics of an individual (e.g., the user 104) associated with the proposed transaction may be received by the receiving device of the processing server.

In step 408, impulsiveness of the proposed transaction may be determined by a determination module (e.g., the determination module 218) of the processing server based on a comparison of the one or more baseline biometric characteristics to the one or more current biometric characteristics. In step 410, a transaction recommendation based on the determination impulsiveness may be electronically transmitted by a transmitting device (e.g., the transmitting device 222) of the processing server, wherein the recommendation is to proceed with the proposed transaction if the proposed transaction is determined to not be impulsive, and the recommendation is to not proceed with the proposed transaction if the proposed transaction is determined to be impulsive.

In one embodiment, the transaction recommendation may be electronically transmitted to a computing device (e.g., the computing device 112) interfaced with a display device configured to display the recommendation to the individual. In a further embodiment, the display device may be one of: an augmented reality or virtual reality display device. In an even further embodiment, the transaction data may be received from the computing device, and the transaction amount may be based on one or more products identified via image recognition using the augmented reality or virtual reality display device.

In some embodiments, the recommendation to not proceed with the proposed transaction may be accompanied by a recommendation for an alternative transaction. In a further embodiment, the alternative transaction may be based on at least the budget amount. In one embodiment, the transaction data and current biometric characteristics may be received from a common computing device (e.g., the computing device 112). In a further embodiment, the transaction recommendation may be electronically transmitted to the common computing device.

Computer System Architecture

Figure 5:
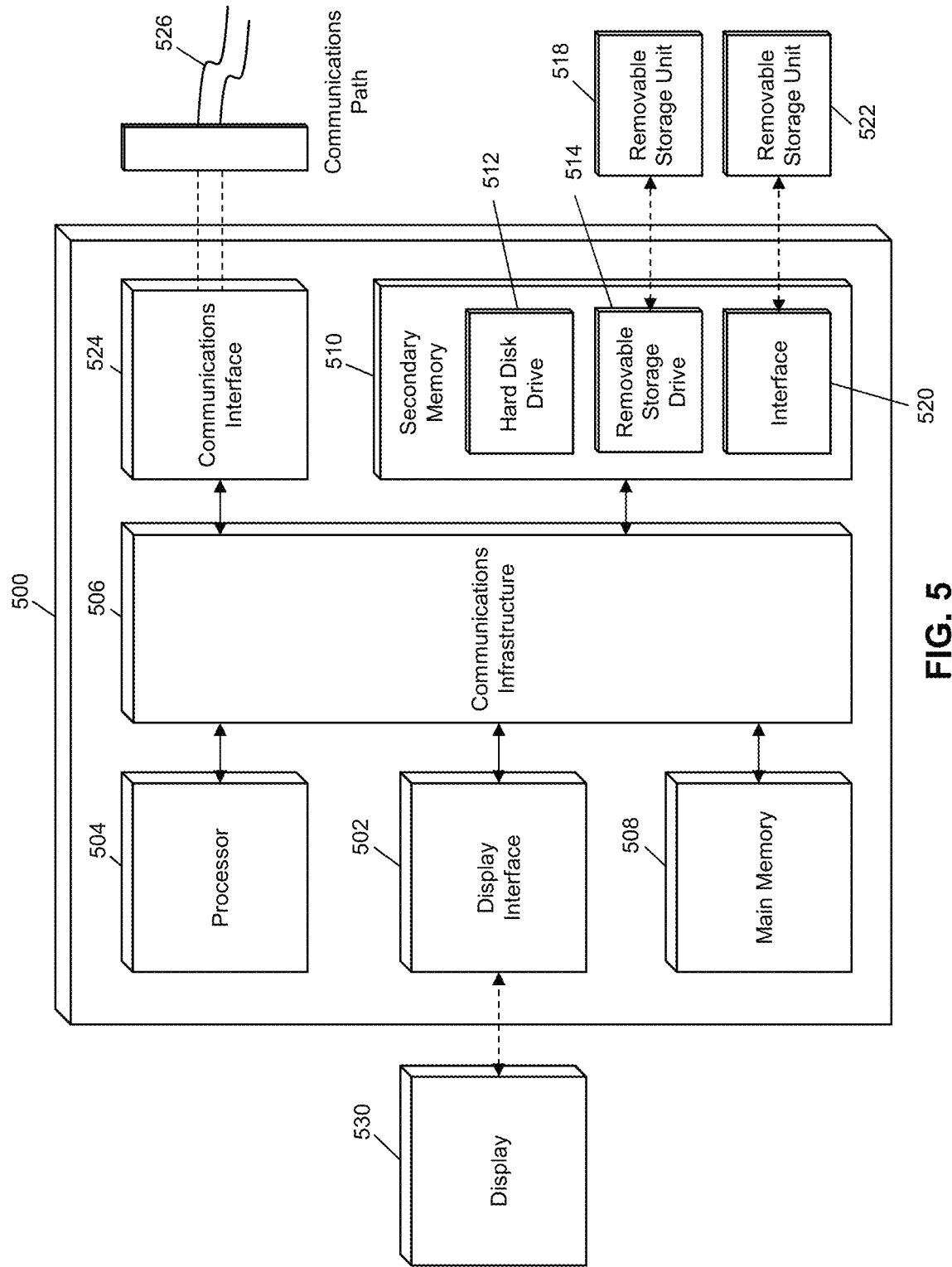
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing recommendations based on emotional intelligence. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing recommendations based on emotional intelligence, comprising:
    storing, in an account database of a processing server, an account profile, wherein the account profile includes a structured data set related to a transaction account including at least an account identifier, a budget restriction, and one or more baseline biometric characteristics;
    receiving, by a receiving device of the processing server, transaction data related to a proposed transaction, wherein the transaction data includes at least a transactional information non-compliant with the budget restriction;
    receiving, by the receiving device of the processing server from a computing device interfaced with an emotion detection sensor or a biometric sensor, one or more current biometric characteristics of an individual associated with the proposed transaction captured with the emotion detection sensor or the biometric sensor;
    determining, by a determination module of the processing server, impulsiveness of the proposed transaction based on a comparison of the one or more baseline biometric characteristics to the received one or more current biometric characteristics captured with the emotion detection sensor or the biometric sensor; and
    electronically transmitting, by a transmitting device of the processing server, a transaction recommendation based on the determined impulsiveness determined based on the received one or more current biometric characteristics captured with the emotion detection sensor or the biometric sensor, wherein the recommendation is to proceed with the proposed transaction if the proposed transaction is determined to not be impulsive, and the recommendation is to not proceed with the proposed transaction if the proposed transaction is determined to be impulsive.

2. The method of claim 1, wherein the transaction recommendation is electronically transmitted to a second computing device interfaced with a display device configured to display the recommendation to the individual.

3. The method of claim 2, wherein the display device is one of: an augmented reality or virtual reality display device.

4. The method of claim 3, wherein
    the transaction data is received from the second computing device, and
    the transaction amount is based on one or more products identified via image recognition using the augmented reality or virtual reality display device.

5. The method of claim 1, wherein
    the recommendation to not proceed with the proposed transaction is accompanied by a recommendation for an alternative transaction.

6. The method of claim 5, wherein the alternative transaction is based on at least the budget restriction.

7. The method of claim 1, wherein the transaction data and current biometric characteristics are received from a common computing device.

8. The method of claim 7, wherein the transaction recommendation is electronically transmitted to the common computing device.

9. A method for providing recommendations based on emotional intelligence, comprising:
    storing, in an account database of a processing server, an account profile, wherein the account profile includes a structured data set related to a transaction account including at least an account identifier, a budget restriction, and one or more baseline biometric characteristics;
    receiving, by a receiving device of the processing server, transaction data related to a proposed transaction, wherein the transaction data includes at least a transactional information non-compliant with the budget restriction;
    receiving, by the receiving device of the processing server from one or more biometric measuring devices, one or more current biometric characteristics of an individual associated with the proposed transaction captured with the one or more biometric measuring devices;
    determining, by a determination module of the processing server, impulsiveness of the proposed transaction based on a comparison of the one or more baseline biometric characteristics to the received one or more current biometric characteristics captured with the one or more biometric measuring devices; and
    electronically transmitting, by a transmitting device of the processing server, a transaction recommendation based on the determined impulsiveness determined based on the received one or more current biometric characteristics captured with the one or more biometric measuring devices, wherein the recommendation is to proceed with the proposed transaction if the proposed transaction is determined to not be impulsive, and the recommendation is to not proceed with the proposed transaction if the proposed transaction is determined to be impulsive, wherein the transaction recommendation is electronically transmitted to a second computing device interfaced with a display device configured to display the recommendation to the individual, wherein the display device is one of: an augmented reality or virtual reality display device.

10. The method of claim 9, wherein
the transaction data is received from the second computing device, and
the transaction amount is based on one or more products identified via image recognition using the augmented reality or virtual reality display device.

11. The method of claim 9, wherein
the recommendation to not proceed with the proposed transaction is accompanied by a recommendation for an alternative transaction.

12. The method of claim 11, wherein the alternative transaction is based on at least the budget restriction.

13. The method of claim 9, wherein the transaction data and current biometric characteristics are received from a common computing device.

14. The method of claim 13, wherein the transaction recommendation is electronically transmitted to the common computing device.

15. A system for providing recommendations based on emotional intelligence, comprising:
an account database of a processing server configured to store an account profile, wherein the account profile includes a structured data set related to a transaction account including at least an account identifier, a budget restriction, and one or more baseline biometric characteristics;
a receiving device of the processing server configured to receive transaction data related to a proposed transaction, wherein the transaction data includes at least a transactional information non-compliant with the budget restriction, and
receive, from a computing device interfaced with an emotion detection sensor or a biometric sensor, one or more current biometric characteristics of an individual associated with the proposed transaction captured with the emotion detection sensor or the biometric sensor;
a determination module of the processing server configured to determine impulsiveness of the proposed transaction based on a comparison of the one or more baseline biometric characteristics to the received one or more current biometric characteristics captured with the emotion detection sensor or the biometric sensor; and
a transmitting device of the processing server configured to electronically transmit a transaction recommendation based on the determined impulsiveness determined based on the received one or more current biometric characteristics captured with the emotion detection sensor or the biometric sensor, wherein the recommendation is to proceed with the proposed transaction if the proposed transaction is determined to not be impulsive, and the recommendation is to not proceed with the proposed transaction if the proposed transaction is determined to be impulsive.

16. The system of claim 15, wherein the transaction recommendation is electronically transmitted to a second computing device interfaced with a display device configured to display the recommendation to the individual.

17. The system of claim 16, wherein the display device is one of: an augmented reality or virtual reality display device.

18. The system of claim 17, wherein
the transaction data is received from the second computing device, and
the transaction amount is based on one or more products identified via image recognition using the augmented reality or virtual reality display device.

19. The system of claim 15, wherein
the recommendation to not proceed with the proposed transaction is accompanied by a recommendation for an alternative transaction.

20. The system of claim 19, wherein the alternative transaction is based on at least the budget restriction.

21. The system of claim 15, wherein the transaction data and current biometric characteristics are received from a common computing device.

22. The system of claim 21, wherein the transaction recommendation is electronically transmitted to the common computing device.

23. A system for providing recommendations based on emotional intelligence, comprising:
an account database of a processing server configured to store an account profile, wherein the account profile includes a structured data set related to a transaction account including at least an account identifier, a budget restriction, and one or more baseline biometric characteristics;
a receiving device of the processing server configured to receive transaction data related to a proposed transaction, wherein the transaction data includes at least a transactional information non-compliant with the budget restriction, and
receive, from a computing device interfaced with one or more biometric measuring device, one or more current biometric characteristics of an individual associated with the proposed transaction captured with the one or more biometric measuring devices;
a determination module of the processing server configured to determine impulsiveness of the proposed transaction based on a comparison of the one or more baseline biometric characteristics to the received one or more current biometric characteristics captured with the one or more biometric measuring devices; and
a transmitting device of the processing server configured to electronically transmit a transaction recommendation based on the determined impulsiveness determined based on the received one or more current biometric characteristics captured with the one or more biometric measuring devices, wherein the recommendation is to proceed with the proposed transaction if the proposed transaction is determined to not be impulsive, and the recommendation is to not proceed with the proposed transaction if the proposed transaction is determined to be impulsive,
wherein the display device is one of: an augmented reality or virtual reality display device,
wherein the transaction recommendation is electronically transmitted to a second computing device interfaced with a display device configured to display the recommendation to the individual.

24. The system of claim 23, wherein
the transaction data is received from the second computing device, and the transaction amount is based on one or more products identified via image recognition using the augmented reality or virtual reality display device.

25. The system of claim 23, wherein the recommendation to not proceed with the proposed transaction is accompanied by a recommendation for an alternative transaction.

26. The system of claim 25, wherein the alternative transaction is based on at least the budget restriction.

27. The system of claim 23, wherein the transaction data and current biometric characteristics are received from a common computing device.

28. The system of claim 27, wherein the transaction recommendation is electronically transmitted to the common computing device.

* * * * *